July 25, 1933.　　　　H. B. LEE　　　　1,919,233

VALVE

Filed Feb. 19, 1932　　　3 Sheets-Sheet 2

INVENTOR-
HENRY B. LEE
BY
Bohleber & Ledbetter
HIS ATTORNEYS

INVENTOR-
HENRY B. LEE
BY
Bohleher & Ledbetter
HIS ATTORNEYS

Patented July 25, 1933

1,919,233

UNITED STATES PATENT OFFICE

HENRY B. LEE, OF TROY, NEW YORK, ASSIGNOR TO THE LUDLOW VALVE MANUFACTURING COMPANY, OF TROY, NEW YORK, A CORPORATION OF NEW JERSEY

VALVE

Application filed February 19, 1932. Serial No. 593,973.

This invention relates to improvements in valves, throttling orifices, metering orifices and like devices for controlling the flow of expansible fluids, for example, steam, although the invention is not limited to the above enumerated devices and is applicable to any fluid having the characteristics or effects of an expansible fluid.

Generally, as heretofore constructed, valves and throttling orifices have not only been extremely noisy when employed for controlling high pressure high density expansible fluids, but have also been subject to the rapid and destructive erosion of their coacting surfaces, owing to the high velocity at which such high pressure elastic expansible fluids tend to flow through a restricted opening, as at the beginning of the opening movement or when a valve in partly open position is used to reduce the pressure of the fluid flowing therethrough.

The rapid and destructive erosion of the coacting surfaces of throttling orifices, including valves, owing to the high velocity at which such high pressure elastic expansible fluids tend to flow through restricted openings, has been reduced by the valve disclosed in my previous patent, Reissue No. 17,824, reissued October 14, 1930. This patent illustrates a valve having coacting male members and female members so constructed and arranged as to form between them a flow passage having a progressively increasing area of flow from the inlet to the outlet; one of said members being formed with a series of flanges and expansion chambers, alternating one with another, and one of said members being movable with respect to its coacting member, whereby the passage past each flange may be coincidentally varied and the velocity of the fluid reduced as a result of the resulting successive reductions of pressure at the respective flanges. Thus the passage defined by each flange and the proximate wall of the coacting member forms what is, in effect, an orifice in a thin plate through which the fluid passes with a resulting decrease of pressure and consequent increase of velocity, which increase of velocity is dissipated and the velocity is further decreased in the subsequently adjacent expansion chamber. By the provision of a series of such alternating flanges and expansion chambers, the pressure is reduced, step by step, from a predetermined maximum to a predetermined minimum.

In a copending application, Serial No. 591,551, filed February 8, 1932, there is shown an expansible fluid valve having a capacity to throttle the fluid passing therethrough in which the respective expansion chambers, formed in either the movable member or in the stationary member, are so constructed and arranged as to divert a portion at least of the stream of expansible fluid after it has passed the orifice formed by a rib and is at a lower pressure but at an increased velocity and direct it back into the stream, preferably at or about the "vena contracta" thereof and the turbulence caused by the impingement of the one stream on the other, at a different angle, accompanied by the retardation of the main stream by the counter-current flow of the diverted stream in contact therewith serves to reduce the velocity of the fluid.

One object of the present invention is an expansible fluid valve which is an improvement over the valve of my previous patent.

Still another object of the invention is an expansible fluid valve in which the pressure reduction at each stage is greater than is possible with that valve of the copending application.

Still another object of the invention is to provide a valve or a throttling device which is capable of adjustment to provide predetermined cross-sectional areas of the flow passage whereby a desired pressure reduction may be obtained and the device may serve to throttle or control the expansible fluid flowing through the passage.

It is also an object of the invention to obtain in such a valve a greater range of effectiveness in each successive reduction of the velocity of the fluid.

The invention also seeks, in a valve or other throttling orifice a greater efficiency in the pressure reduction at each stage whereby the same pressure reduction is obtained as that of the patented valve, either with flow passages of relatively greater cross-sectional area or with a fewer number of pressure reduction stages in a flow passage of the same cross-sectional area as the patented valve.

It is a further object of the invention to provide a throttling orifice which shall be self-cleaning and prevent the deposit or collection of matter from the fluid in the expansion chambers.

The invention also seeks a valve which reduces the erosion of the valve seat and/or valve when the valve first moves from closed position to partially open position in the course of its movement to substantially fully open position.

In carrying out the invention, in its preferred embodiment both of a pair of coacting members are formed with one or a plurality of ribs, each of which, with a selected rib of the coacting member, forms, in partially opened position, what is in effect an "orifice in a thin plate" and the fluid flowing through each orifice has its pressure reduced a predetermined amount. A portion at least of the stream of expansible fluid on each side thereof, after it has passed the orifice and is at a lower pressure but at an increased velocity, is diverted and directed back into the stream preferably at or about the "vena contracta" thereof and the turbulence caused by the impingement of the two returning streams on the main stream, at different angles thereto, accompanied by the retardation of the main stream by the counter-current flow of the diverted streams in contact therewith, serves at each stage to reduce most efficiently the velocity of the fluid, thus affording a greater pressure reduction or throttling action for a given flow passage or the same pressure drop with a flow passage of larger cross-sectional area or, all other factors being equal, permits the use of an expansion chamber of smaller volumetric capacity than is possible with the disclosure of the patent. To effect the return of portions of the main stream of expansible fluid, in each expansion chamber, the walls of the relatively movable members are each curved from the next succeeding thin plate orifice in the direction of and toward the preceding orifice.

Preferably the curvature is such as to afford the highest velocity to the returning fluid, i. e., one shaped substantially to conform to the path taken by the returning fluid or at least not offer obstruction thereto. By such curvature, I have also found that the coacting surfaces are free from deposits of solid matter, for instance, sand, pebbles, hard scale formations, carbon, tar, small steel chips, etc., which are sometimes carried along with the fluid at high velocities, particularly in oil well and oil still discharges, and collect on the surfaces of all valves and throttling orifices and similarly functioning devices heretofore known.

These and other objects of the invention and the means for their attainment will be more apparent from the following detailed description, taken in connection with the accompanying drawings illustrating various embodiments by which the invention may be realized, and in which:—

Figure 1:
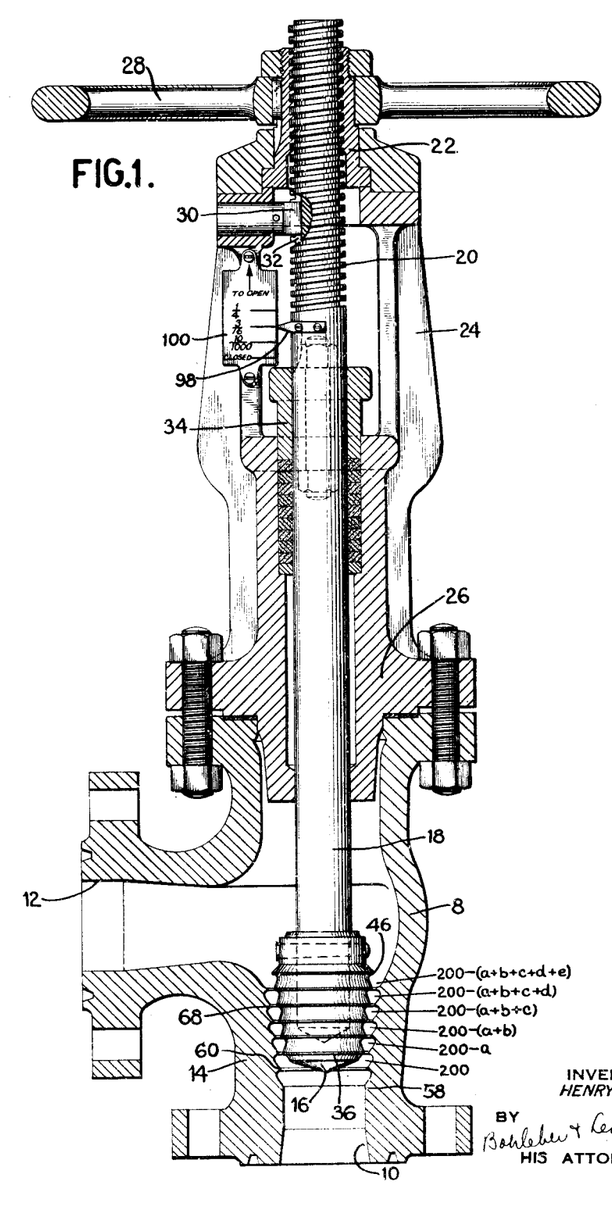
Figure 1 is a view, in longitudinal section and partly in elevation, showing this invention applied to an erosion reducing valve capable of use not only to close the flow passage but also capable of a plurality of adjustments to afford throttling orifices of selected cross-sectional area to control the flow of fluid therethrough to a predetermined degree.

In Figure 1, the invention is shown as applied to a valve casing 8 having an inlet port 10 and an outlet port 12. Axially in line with the inlet port and in its lower end, the casing 8 is formed with, or otherwise provided with a generally frusto-conical tube-like female member portion 14. In the illustrated embodiment, the female member portion of the casing is provided with a plurality of annular recesses or grooves hereinafter more fully described. Obviously, these grooves may be formed in a separate element or thimble, threaded or otherwise secured in the wall of the casing, and formed of some material having inherent resistance to corrosion and capable of withstanding very high pressures but in most situations it may not be found necessary to form the recesses or grooves on a member having different characteristics from that of the casing itself or it may be found desirable to form the casing of wear resistant material, and, in either event, the wall of the casing may itself serve as the grooved or recessed female member, as in the illustrated embodiment. By the term "female member", therefore, is intended any element or portion of the structure which is relatively fixed and upon which the recesses or grooves are formed. The female member receives an axially adjustable male frusto-conical member 16. For the purpose of axially adjusting the male member 16 with respect to the female member 14, the same is shown as mounted upon the lower end of a valve stem formed with threads 20 engaging corresponding threads formed in a nut 22 rotatable in a yoke 24 on a bonnet 26, which latter, as shown, is secured in any convenient fashion to the upper end of the valve casing 8. The nut is rotated by means of a hand wheel 28 to move the valve 16, by translation of the stem 18, between fully closed and fully opened positions or to any intermediate partially open position. A key 30 in the yoke 24 is shown as guiding the valve stem by its location in a keyway 32 therein. The valve stem extends through a packing gland 34 on the bonnet.

For preventing undesirable rise in the velocity of the steam or other elastic expansible fluid expanding between the inlet port and the outlet port, the male frusto-conical member, above described, is formed with a series of recurring annular portions, lands or ribs, indicated at 36, 38, 40, 42, 44 and 46 and shown as six in number in the embodiment illustrated, of relatively greater diameter, and lying in planes substantially transverse to the axis of the valve stem, and annular recessed portions formed by reducing the male member between the ribs to a relatively less diameter to form annular expansion chamber portions 48, 50, 52, 54 and 56.

Similarly, the female member 14 is formed with a series of recurring annular portions or lands or ribs also lying in planes substantially transverse to the axis thereof and indicated at 58, 60, 62, 64, 66 and 68, and shown as six in number in the embodiment illustrated, of relatively lesser diameter, and annular recessed portions or grooves formed by grooving the female member between the ribs to a relatively greater diameter to form annular expansion chamber portions 70, 72, 74, 76 and 78.

According to the well known laws governing the flow of expansible fluids as fully explained in the patent, the velocity through an orifice, say, the orifice formed between the valve member and female member adjusted to reduce its pressure a given amount, is readily determined and would be a velocity of the fluid flowing between the inlet and the outlet when in a partially opened position were it not for the interposition of the coacting ribs and expansion chamber portions as described. Expansible fluid flowing at such a high velocity would not only cause excessive noise but would also cause the rapid erosion of the walls of the orifice. As in the valves of my prior patent and copending application, since velocity is dependent upon pressure, the prevention of undesirable rise in the velocity is effected by reducing the pressure in two or more steps instead of in one step, whereby the relatively slight reduction in pressure at each stage results in but slight increased velocity and this velocity is overcome at each stage in the subsequent adjacent expansion chamber.

As has been explained, the cooperating ribs form what is, in effect, an orifice in a thin plate. As an example, the said orifice may be formed by the rib, say, 38, Figure 6, and the rib on the female member immediately opposite thereto at any given point of adjustment of the throttling device, and the expansible fluid flowing past this orifice forms a jet, as shown by the arrows. At a distance along the center line of the jet equal to one half the dimension of the opening, the stream contracts to about six tenths of the opening. This contraction of the jet is shown at 80 and is known as the "vena contracta". As will be understood, the pressure of the fluid is reduced on passing through the thin plate orifice while the velocity is increased so that the velocity at the thin plate orifice is only 0.6 that attained at the "vena contracta". Beyond the "vena contracta" the stream or jet increases in cross-sectional area, as shown at 82, that is, it expands, and this expansion in the subsequent expansion chamber formed by the registering recesses 50 and 72 results in a reduction of the velocity, as will be understood.

Figure 6:
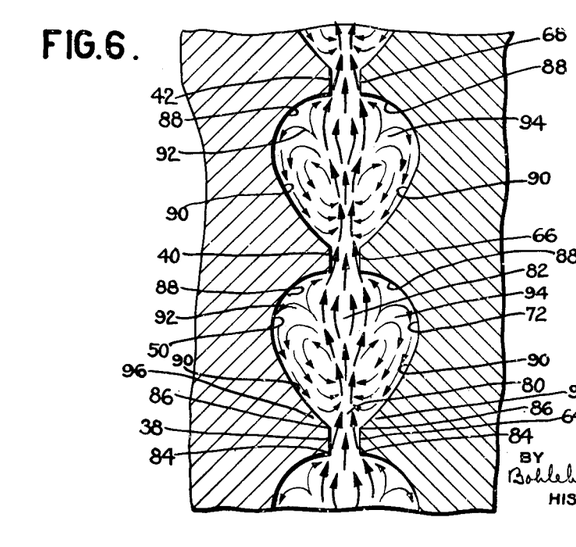
Figure 6 is a detailed view showing, in section, the companion recesses in the coacting members forming between them expansion chambers in the flow passage and with arrows illustrating the different paths of the fluid in the flow passage.

As shown in Figure 6, and as will be appreciated, the ribs 36, 38, 40, 42, 44 and 46 and 58, 60, 62, 64, 66 and 68 must be designed according to the theory of the "thin plate orifice." For this reason, the flange edge 84 on each rib, first presented to the oncoming column of fluid and where said ribs, respectively, contact on occasion with the coacting rib must be as sharp as practical although I have found that the sharp corner can be reduced to what may be called a "blunt edge" for all practical purposes. The thickness of each rib, the distance between the leading edge 84 and the rear edge 86, which forms the thickness of the wall of the orifice should be as small as possible so as to give the effect of the thin plate. A longer wall of the orifice will give the effect of a "straight short tube orifice" which, as is well known, will increase the velocity and increase the erosion of the coacting parts. Too great a thickness will thus prevent the formation of a "vena contracta." I have found that, as a general rule, the land thickness or distance 84—86 should be 1/16 of an inch or less.

As shown in Figure 6, the walls of the respective coacting members, between successive ribs, are curvilinear in outline and are shown as beginning at, say, the ribs 40 and 42 (considering the direction of flow of the returning portion of the fluid) with a curve of relatively less radius indicated at 88 beginning at the subsequent thin plate orifice and gradually merging into a curve of greater radius at 90 in the direction of the flow of fluid, thus forming, preferably, a compound curve, until it merges with the immediately preceding rib at the edge 86. Thus, portions 92 and 94 of the main stream, as the stream expands beyond the "vena contracta," engage with the walls of the expansion chamber on each side of the next succeeding thin plate orifice and are directed rearwardly and back into the main stream on each side of the main stream, conveniently at or about the "vena contracta" thus forming eddy currents. The curvature is primarily such as to give the highest velocity possible for this returning stream. The higher the velocity of these eddy currents, the greater will be their retarding effect on the main stream at the "vena contracta" because the diverted fluid of the eddy current is flowing in a direction substantially opposite to the direction of the main stream. Although of lower velocity, its velocity is sufficient to have a retarding effect and also since it is directed by the walls into the main stream, in the opposite direction, it tends to cause a turbulence at or about the "vena contracta" which breaks up or opposes the flow of fluid at that point and further tends to retard the flow. The curvature of the walls of the respective coacting chamber portions is preferably the same and is selected to be that which the returning stream naturally follows and which may be called the "slip stream" thereof, thereby to avoid friction as much as possible, and is such as not to retard or hinder the velocity of the flow of the returning portions in any manner. The material at 96 immediately behind the ribs (considering the direction of flow of the main stream through the flow passage) supports and reenforces the ribs and gives adequate strength to the structure right to the outer marginal surfaces of the ribs between the edges 84 and 86.

Furthermore, the curvature of the wall of the expansion chamber, as described, results in a freedom of clogging of the valve, that is, during use, it is found that there are no deposits of solids from the fluid in the expansion chambers and even after extended use the surfaces of the expansion chambers will present a clean and burnished appearance although the valve may have been used to throttle fluids carrying a large proportion of solids.

It will be obvious that if the chambers are not properly shaped and if the opening at the orifice is large and the chambers very short or narrow, say, less than $\tfrac{1}{10}$ths of an inch wide from rib to rib, the stream will flow or rush by the chambers and subsequent ribs, as in a "straight short tube orifice," and little step by step pressure reduction, if any, will result. No simple proportion of width of chambers can be set down because the character of fluids, their velocities, and pressures vary over a very wide range. Taking oil, as it leaves a high pressure well, as an example of such variations in the character of fluids and their action, (such oil contains varying amounts of gas in solution, which gas will expand upon being subjected to a lower pressure and, therefore, the fluid discharged from an oil well can be considered an elastic fluid even though it is cold.

The eddy current or expansion chamber should be designed to give the highest velocity possible for the returning stream of fluid. The higher the velocity of the eddy currents, the greater will be the retarding effect on the main stream at the "vena contracta" because they flow nearly in the opposite direction to the main stream. Of course, the velocity of the eddy currents will be much lower than the main stream at the "vena contracta". The eddy current chambers are semi-pear shaped and their general dimensions vary with the desired capacity and velocity and character of fluid. The depth of the grooves or expansion chamber portions in most instances should be not less than ⅓ of their width, i. e., from the edge 86 of one rib to the edge 84 of the next succeeding rib. For large orifice or valve openings wider grooves or chambers will be required than for small orifice or valve openings, but I have found that 3/16ths of an inch is the smallest practical effective width of groove. Most valves will have wider grooves than 3/16ths of an inch. In every instance, however, the depth should not be substantially less than ⅓ the width.

Presuming, for the purpose of description, that a fluid pressure of 200 lbs. per square inch exists at the inlet port and that the members have been properly proportioned and adjusted with respect to each other so as to permit sufficient fluid to pass to maintain a pressure of $200-(a+b+c+d+e)$ lbs. per square inch to the outlet port 12, the functioning of the improved throttling valve of this invention may be described as follows:—

The coacting or cooperating ribs 36 and 62 (Figs. 1 and 3) will step the pressure down from 200 lbs. to, say, 200 minus $a$ pounds by the time it reaches the expansion chamber 48, 74, and will, therefore, only have been exposed to the action of steam leaving at the relatively low velocity of $v$ feet per second. Now let it be assumed that five ribs on the respective members coact and that these ribs form thin plate orifices, respectively, of a greater cross-sectional area than contemplated with the patented valve or with the valve of the application, but still within a range of opening in which the effect of a thin plate orifice is obtained. As an example, it may be parenthetically pointed out that whereas, with the expansion chambers such as are illustrated in the patent wherein the greatest diameter of opening between the rib and the wall giving a pressure reduction for a given fluid with an opening of approximately 10/1000ths of an inch and whereas the valve of the copending application affords the same pressure reduction with the same fluid and with the same number of stages of pressure reduction but with expansion chambers of smaller volumetric capacity with an opening, say, of 20/1000ths of an inch, the valve of this invention will give the same pressure reduction with a still greater flow opening or with a still fewer number of stages of pressure reduction. The next succeeding coacting ribs 38, 64 will serve to step the pressure down from, say, $200-a$ lbs. to $200-(a+b)$ lbs., and will also be subjected to the action of fluid moving at the rate of $v$ feet per second because, since the difference in pressure between two points determines the velocity of flow between them, and, therefore, a relatively slight reduction in pressure results in but slight increase in velocity. This step by step reduction of pressure will be continued by the successive ribs, as shown in Figure 1, until by the time the fluid reaches the outlet port 12, it will have been reduced to $200-(a+b+c+d+e)$ lbs. per square inch. This reduction of pressure from 200 lbs. to $200-(a+b+c+d+e)$ lbs. will thus have been accomplished in the illustrated example in five stages without having subjected any part of the valve to the action of the steam at greater than $v$ feet per second, as compared with a velocity of, for steam, 1675 feet per second, which would have been the velocity were it not for the interposition of the ribs and expansion chambers, with the result that erosion is substantially avoided and silent action obtained.

It will be apparent from the foregoing description that the peculiarly shaped expansion chamber of a valve of this invention due to its greater efficiency and increased capacity of the expansion chamber, will give a greater pressure reduction at each stage with a wider valve opening. It follows, therefore, that for a lesser valve opening the pressure reduction may be accomplished with a fewer number of stages. Only one or possibly two stages may be necessary in some situations. Obviously, in view of the greater efficiency of pressure reduction at each stage, the same pressure reduction may be effected with a fewer number of stages provided the flow passage is restricted, that is, there is a definite relation (with a given fluid) between the cross-sectional area of the flow passage and the number of stages necessary to effect a given pressure reduction.

As is well known in any type of valve used to control fluids at high pressure when the valve is being opened and at what is known as cracked position, the flow of fluid at high pressure through the restricted opening causes an increase in its velocity resulting in erosion of the valve seats and necessitating their frequent replacement. One, two or more stages of pressure reduction in accordance with this invention may be provided by providing the coacting relatively movable members with a requisite number of ribs and expansion chamber portions in accordance with this invention so that when the movable member moves off its seat in the opening movement, the fluid rushing through the restricted orifice at high velocity will be throttled and no damage to the seat or its seat will result.

It will thus be seen that the invention is equally applicable to valves of many different types. The outer peripheral marginal surfaces of the ribs may conveniently lie all in the same conical plane or surface and the elements of this surface may be parallel to the elements of the conical plane or surface of the ribs on the female member which may also all lie in the same conical plane or surface. In this event, substantially all of the ribs will have sealing contact with companion ribs at the closed position of the valve. However, the elements of the conical surface of the movable member may lie at an angle to the elements of the conical surface of the seating member, in which event only one of the ribs on the movable member may have sealing contact with a rib on the female member or where the coacting parts are used solely to provide a throttling orifice, no rib need have sealing contact with another rib.

Figure 2:
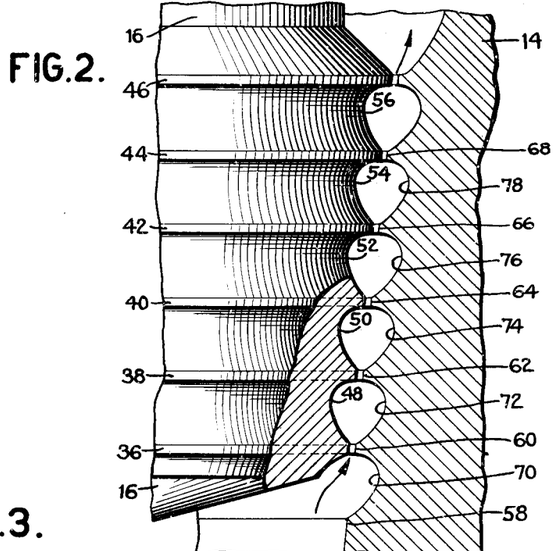
Figure 2 is a view, on an enlarged scale, showing fragmentary portions of the relatively movable coacting members adjusted to provide a flow passage of relatively small cross-sectional area.
Figure 3:
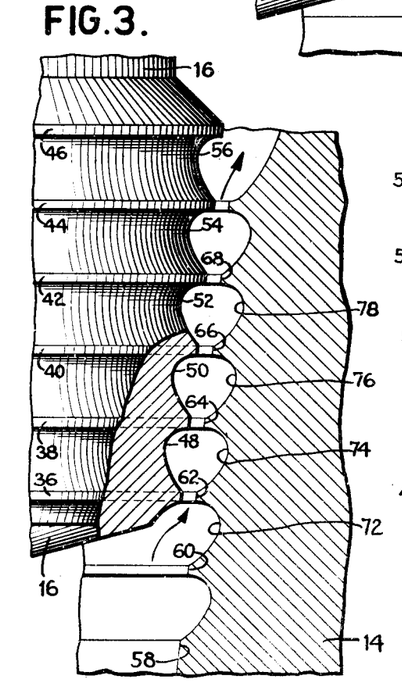
Figure 3 is a view, similar to Figure 2, but showing the coacting members adjusted to provide a relatively larger cross-sectional area of flow passage.
Figure 4:
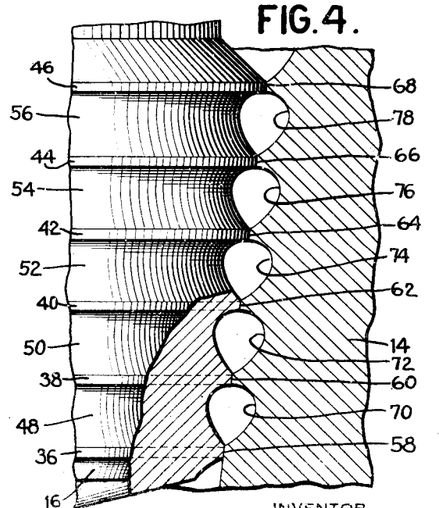
Figure 4 is a view similar to Figures 2 and 3 but showing the coacting members in position to close the flow passage.

It will be apparent from the foregoing description that while the invention is applicable to a valve, as shown in Figure 4, adapted both to seal an opening and to reduce erosion in partially open position and/or during the opening movement of the valve after it has just left sealing position and in what may be called the cracked position of the valve, that the invention is equally applicable as an adjustable throttling device. Thus provision is made, in the structure shown in Figure 1, for indicating, to the operator of the valve, certain predetermined points in the opening movement where predetermined ribs on the coacting members are in registration with one another to afford openings of prescribed cross-sectional area. Thus the valve stem, Figure 1, may be provided with an index 98 and a scale 100, carried with the yoke 24, is so graduated as to show the closed position of the valve or a valve opening, for instance, as in Figure 2, where the rib 36 on the movable member is in register with the rib 60 on the stationary member, or a larger valve opening, where rib 36 is in register with rib 62, as shown in Figure 3, or a still greater valve opening or, in fact, any number of valve openings wherein successive ribs register with the companion ribs so as to form thin plate orifices of a desired cross-sectional area, and thus the valve shown in Figure 1 may be used as a throttling orifice to afford a given pressure in the pipe line.

Figure 5:
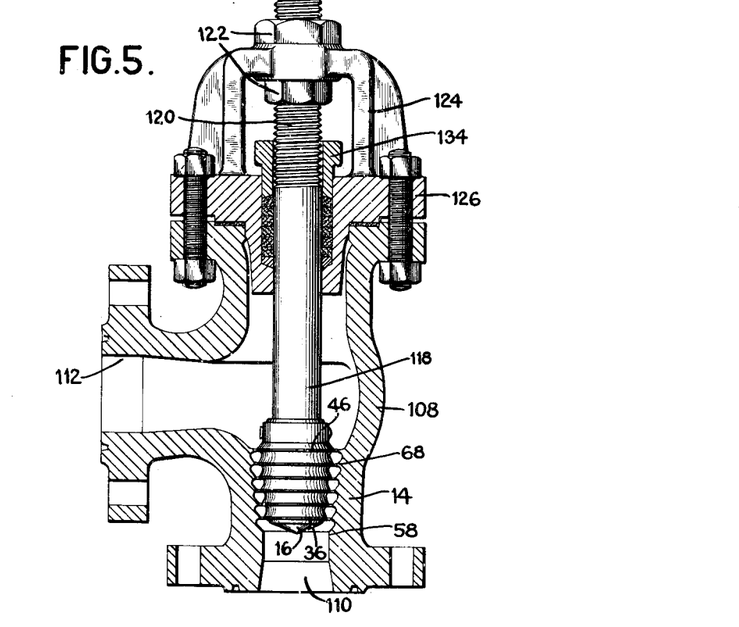
Figure 5 is a view, in longitudinal section and partly in elevation, showing the invention applied to a fixed orifice pressure reducing device, which device is, however, capable of being set to the desired flow opening to attain a desired pressure reduction.

Situations will also arise where the principle of this invention shall be applied to limit the pressure in a given line at all times to a predetermined maximum as in the steam heating systems of buildings where a number of different branches from a common heating plant lead, respectively, to different wings, say, of the building, and it is found that the steam flows more readily in one branch in one wing than in another. In this event, a throttling device according to this invention may be placed in the respective branch lines and permanently adjusted to deliver fluid at only the requisite pressure to that line. In Figure 5, the body of a throttling device is indicated at 108, having an inlet port 110 and an outlet port 112. Axially in line with the inlet port and in its lower end, the casing is formed with or otherwise provided with a female member portion 14 formed with a series of recurring ribs and expansion chamber portions similar to those hereinbefore described. The female member receives an axially adjustable frusto-conical male member 16. For the purpose of axially adjusting the member with respect to the female member, the same is shown as mounted upon the lower end of a stem 118 passing through a stuffing box 134 carried by a cap member 126, which stem 118 is formed with threads 120 engaging corresponding threads in lock nuts 122 disposed one on each side of a yoke 124 on the cap member 126, which latter is shown as secured in any convenient fashion to the upper end of the casing. The stem passes through a hole in the yoke and is provided, at its upper end, with a polygonal end to receive a wrench used in rotating the valve stem to cause its movement of translation through the cap to move the male member to adjusted position.

The male member is provided with recurring ribs and recesses or expansion chamber portions, as described hereinbefore. Thus, by means of a wrench the male member may be adjusted with respect to the female member to bring a desired rib thereon in register with the rib on the female member to provide a flow passage of desired cross-sectional area. The throttling device is thus set for a given fluid and a given pressure in the line and cannot readily be tampered with.

It will thus be seen that a valve, throttling device, metering orifice or like device has been provided wherein coacting sealing surfaces of the relatively movable members are so constructed as to offer a throttling action to fluid passing therethrough thereby reducing the velocity and preventing erosion of the coacting surfaces and effecting this throttling with greater efficiency than previously proposed, and the invention is equally applicable to many different devices for many different purposes.

Various modifications will occur to those skilled in the art in the composition, disposition and configuration of the component elements going to make up the invention as a whole, as well as in the use to which the invention may be put and no limitation is intended by the phraseology of the foregoing description or illustrations in the accompanying drawings, except as indicated in the accompanying claims.

What is claimed is :—

1. The method of effecting a reduction in the pressure of a fluid flowing as a stream which consists in diverting separate portions of the stream of fluid back into the said stream and in a direction other than that of said stream.

2. The method of effecting a reduction in the pressure of a fluid having the characteristics of an expansible fluid and flowing as a stream which consists in diverting separate portions of the stream of fluid back into the said stream and in a direction other than that of said stream.

3. The method of effecting a reduction in the pressure of a fluid having the characteristics of an expansible fluid, which consists in effecting such pressure reduction in a step by step manner in a stream of the fluid flowing through a flow passage and at each step diverting separate portions of the fluid back into the said stream and in a direction other than that of said stream.

4. The method of effecting a reduction in the pressure of a fluid having the characteristics of an expansible fluid, which consists in effecting such pressure reduction in a step by step manner in a stream of the fluid flowing through a flow passage and at each step permitting a predetermined degree of expansion and diverting separate predetermined portions of the expanding fluid back into the stream in a direction other than the direction of the stream through the flow passage and substantially at a point in the stream where the velocity is highest at that step of pressure reduction to maintain the velocity at each step at some desired rate within a range below the velocity by natural law accompanying the same total pressure reduction in a single step of expansion.

5. A device of the character described comprising a fixed part and an adjustable part forming between them a flow passage increasing in flow area toward its outlet, said passage comprising at least one expansion receiving chamber intermediate the inlet and outlet within which the stream of fluid passing through the flow passage expands, and means associated with said chamber to direct separate portions of the expanding fluid as separate streams back into the said stream of fluid in a direction other than that of the flow of said stream to retard the velocity thereof.

6. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular coacting rigs on said parts lying in planes transverse to the flow passage, the wall of said expansion chambers curving from one rib to the next adjacent rib whereby fluid impinging on said wall is deflected in a direction opposed to the direction of flow of the fluid and toward and into the stream of fluid whereby the velocity of the fluid is retarded.

7. A valve comprising a fixed part and an adjustable part forming between them when the valve is open, a flow passage increasing in flow area from one end toward another, said passage comprising a plurality of expansion receiving chambers intermediate the valve inlet and outlet, said chambers being defined by coacting annular rigs on said parts lying in planes transverse to the flow passage, the wall of said expansion chambers curving gradually from one rib to the next adjacent rib whereby fluid impinging on said wall is deflected in a direction opposed to the direction of flow of the fluid and toward and into the stream of fluid whereby the velocity of the fluid is retarded.

8. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on said parts lying in planes transverse to the flow passage, the wall of said chambers curving gradually from an edge of one rib on a compound curve to the edge of the next adjacent rib whereby fluid impinging on said wall is deflected in a direction opposed to and toward and into the stream of fluid whereby the velocity of the fluid is retarded.

9. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on said parts lying in planes transverse to the flow passage, the wall of said chambers curving gradually from an edge of one rib on a curve of relatively greater radius merging into a curve of relatively lesser radius to an edge of the next succeeding rib whereby expanding fluid impinging on said curved wall of relatively lesser radius is deflected and directed in a direction opposed to the direction of flow of the fluid and directed by said curved wall of relatively greater radius toward and into the stream of fluid whereby the velocity of the fluid is retarded.

10. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by series of recurring coacting ribs on said parts and the wall of said chambers curving from one rib to the next adjacent rib of the series, the depth of said chambers from the plane including the outer peripheral edges of the ribs to the innermost surface of the wall of the chambers being substantially one-third the distance between the ribs.

11. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by series of recurring coacting ribs on said parts and the wall of said chambers curving from one rib to the next adjacent rib, the dimension of said chambers from center line of rib to center line of succeeding rib being substantially not less than three-sixteenths of an inch.

12. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by series of recurring coacting ribs on said parts and the wall of said chambers curving gradually from one rib to the next adjacent rib of each series, the dimension of each rib in the axial direction of the flow passage being substantially not less than one-sixteenth of an inch.

13. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by coacting ribs on the respective parts and the wall of said chambers curving gradually from one rib to the next adjacent rib, the depth of said chambers from the plane including the outer peripheral edges of the ribs to the innermost surface of the wall of the chambers being substantially one-third the distance between the ribs and the dimension of said chambers from center line of rib to center line of succeeding rib being substantially not less than three-sixteenths of an inch.

14. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by coacting ribs on the respective parts and the wall of said chambers curving from one rib to the next adjacent rib, the depth of said chambers from the plane including the outer peripheral edges of the ribs to the innermost surface of the wall of the chambers being substantially one-third the distance between the ribs and the dimension of each rib in the axial direction of the flow passage being substantially not less than one-sixteenth of an inch.

15. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by coacting ribs on the respective parts and the wall of said chambers curving gradually from one rib to the next adjacent rib, the depth of said chambers from the plane including the outer peripheral edges of the ribs to the innermost surfaces of the wall of the chambers being substantially one-third the distance between the ribs, the dimension of said chambers from center line of rib to center line of succeeding rib being substantially not less than three-sixteenths of an inch and the dimension of each rib in the axial direction of the flow passage being substantially not less than one-sixteenth of an inch.

16. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular coacting ribs on the respective parts lying in planes transverse to the flow passage, the wall of said expansion chambers curving gradually from one rib to the next adjacent rib whereby fluid impinging on said wall is deflected in a direction opposed to the direction of flow of the fluid and toward and into the stream of fluid whereby the velocity of the fluid is retarded, the depth of said chambers from the plane including the outer peripheral edges of the ribs to the innermost surface of the wall of the chambers being substantially one-third the distance between the ribs.

17. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular coacting ribs on the respective parts lying in planes transverse to the flow passage, the wall of said expansion chambers curving gradually from one rib to the next adjacent rib whereby fluid impinging on said wall is deflected in a direction opposed to the direction of flow of the fluid and toward and into the stream of fluid whereby the velocity of the fluid is retarded, the dimension of said chambers from center line of rib to center line of succeeding rib being substantially not less than three-sixteenths of an inch.

18. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on the respective parts lying in planes transverse to the flow passage, the wall of said expansion chambers curving gradually from one rib to the next adjacent rib whereby fluid impinging on said wall is deflected in a direction opposed to the direction of flow of the fluid and toward and into the stream of fluid whereby the velocity of the fluid is retarded, the dimension of each rib in the axial direction of the flow passage being substantially not less than one-sixteenth of an inch.

19. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on the respective parts lying in planes transverse to the flow passage, the wall of said expansion chambers curving gradually from one rib to the next adjacent rib whereby fluid impinging on said wall is deflected in a direction opposed to the direction of flow of the fluid and toward and into the stream of fluid whereby the velocity of the fluid is retarded, the depth of said chambers from the plane including the outer peripheral edges of the ribs to the innermost surface of the wall of the chambers being substantially one-third the distance between the ribs, the dimension of said chambers from center line of rib to center line of succeeding rib being substantially not less than three-sixteenths of an inch and the dimension of each rib in the axial direction of the flow passage being substantially not less than one sixteenth of an inch.

20. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on the respective parts lying in planes transverse to the flow passage, the wall of said chambers curving gradually from an edge of one rib on a compound curve to the edge of the next adjacent rib whereby fluid impinging on said wall is deflected in a direction opposed to the direction of flow of the fluid and toward and into the stream of fluid whereby the velocity of the fluid is retarded, the depth of said chambers from the plane including the outer peripheral edges of the ribs to the innermost surface of the wall of the chambers being substantially one-third the distance between the ribs.

21. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on the respective parts lying in planes transverse to the flow passage, the wall of said chambers curving gradually from an edge of one rib on a compound curve to the edge of the next adjacent rib whereby fluid impinging on said wall is deflected in a direction opposed to the direction of flow of the fluid and toward and into the stream of fluid whereby the velocity of the fluid is retarded, the dimension of said chambers from center line of rib to center line of succeeding rib being substantially not less than three-sixteenths of an inch.

22. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on the respective parts lying in planes transverse to the flow passage, the wall of said chambers curving gradually from an edge of one rib on a compound curve to the edge of the next adjacent rib whereby fluid impinging on said wall is deflected in a direction opposed to the direction of flow of the fluid and toward and into the stream of fluid whereby the velocity of the fluid is retarded, the dimension of each rib in the axial direction of the flow passage being substantially not less than one-sixteenth of an inch.

23. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on the respective parts lying in planes transverse to the flow passage, the wall of said chambers curving gradually from an edge of one rib on a compound curve to the edge of the next adjacent rib whereby fluid impinging on said wall is deflected in a direction opposed to the direction of flow of the fluid and toward and into the stream of fluid whereby the velocity of the fluid is retarded, the depth of said chambers from the plane including the outer peripheral edges of the ribs to the innermost surface of the wall of the chambers being substantially one-third the distance between the ribs, the dimension of said chambers from center line of rib to center line of succeeding rib being substantially not less than three-sixteenths of an inch and the dimension of each rib in the axial direction of the flow passage being substantially not less than one-sixteenth of an inch.

24. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on the respective parts lying in planes transverse to the flow passage, the wall of said chambers curving gradually from an edge of one rib on a curve of relatively greater radius merging into a curve of relatively lesser radius to an edge of the next succeeding rib whereby expanding fluid impinging on said curved wall of relatively lesser radius is deflected in a direction opposed to the direction of flow of the fluid and directed by said curved wall of relatively greater radius toward and into the stream of fluid whereby the velocity of the fluid is retarded, the depth of said chambers from the plane including the outer peripheral edges of the ribs to the innermost surface of the wall of the chambers being substantially one-third the distance between the ribs.

25. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on the respective parts lying in planes transverse to the flow passage, the wall of said chambers curving gradually from an edge of one rib on a curve of relatively greater radius merging into a curve of relatively lesser radius to an edge of the next succeeding rib whereby expanding fluid impinging on said curved wall of relatively lesser radius is deflected in a direction opposed to the direction of flow of the fluid and directed by said curved wall of relatively greater radius toward and into the stream of fluid whereby the velocity of the fluid is retarded, the dimension of said chambers from center line of rib to center line of succeeding rib being substantially not less than three-sixteenths of an inch.

26. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on the respective parts lying in planes transverse to the flow passage, the wall of said chambers curving gradually from an edge of one rib on a curve of relatively greater radius merging into a curve of relatively lesser radius to an edge of the next succeeding rib whereby expanding fluid impinging on said curved wall of relatively lesser radius is deflected in a direction opposed to the direction of flow of the fluid and directed by said curved wall of relatively greater radius toward and into the stream of fluid whereby the velocity of the fluid is retarded, the dimension of each rib in the axial direction of the flow passage being substantially not less than one-sixteenth of an inch.

27. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on the respective parts lying in planes transverse to the flow passage, the wall of said chambers curving gradually from an edge of one rib on a curve of relatively greater radius merging into a curve of relatively lesser radius to an edge of the next succeeding rib whereby expanding fluid impinging on said curved wall of relatively lesser radius is deflected in a direction opposed to the direction of flow of the fluid and directed by said curved wall of relatively greater radius toward and into the stream of fluid whereby the velocity of the fluid is retarded, the depth of said chambers from the plane including the outer peripheral edges of the ribs to the innermost surface of the wall of the chambers being substantially one-third the distance between the ribs, the dimension of said chambers from center line of rib to center line of succeeding rib being substantially not less than three-sixteenths of an inch and the dimension of each rib in the axial direction of the flow passage being substantially not less than one-sixteenth of an inch.

28. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular coacting ribs lying in planes transverse to the flow passage, the wall of said expansion chambers curving from one rib to the next adjacent rib whereby fluid impinging on said wall is deflected in a direction opposed to the direction of flow of the fluid and toward and into the stream of fluid whereby the velocity of the fluid is retarded, and means to cause the selective coaction of predetermined ribs on the respective parts.

29. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by coacting annular ribs on the respective parts lying in planes transverse to the flow passage, the wall of said chambers curving gradually from an edge of one rib on a curve of relatively greater radius merging into a curve of relatively lesser radius to an edge of the next succeeding rib whereby expanding fluid impinging on said curved wall of relatively lesser radius is deflected in a direction opposed to the direction of flow of the fluid and directed by said curved wall of relatively greater radius toward and into the stream of fluid whereby the velocity of the fluid is retarded, the depth of said chambers from the plane including the outer peripheral edges of the ribs to the innermost surface of the wall of the chambers being substantially one-third the distance between the ribs, the dimension of said chambers from center line of rib to center line of succeeding rib being substantially not less than three-sixteenths of an inch, the dimension of each rib in the axial direction of the flow passage being substantially not less than one-sixteenth of an inch and means to cause and to indicate the selective coaction of said ribs.

30. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular coacting ribs on the respective parts lying in planes transverse to the flow passage, the wall of said expansion chambers curving from one rib to the next adjacent rib whereby fluid impinging on said wall is deflected in a direction opposed to the direction of flow of the fluid and toward and into the stream of fluid whereby the velocity of the fluid is retarded, an axially movable stem upon which the movable part is mounted to cause the selective coaction of predetermined ribs, a relatively fixed scale to indicate predetermined rib settings and an index carried with the stem.

HENRY B. LEE.